April 25, 1950     G. H. COTE     2,505,030
RELEASING TOOLHOLDER
Filed July 29, 1944     2 Sheets-Sheet 1
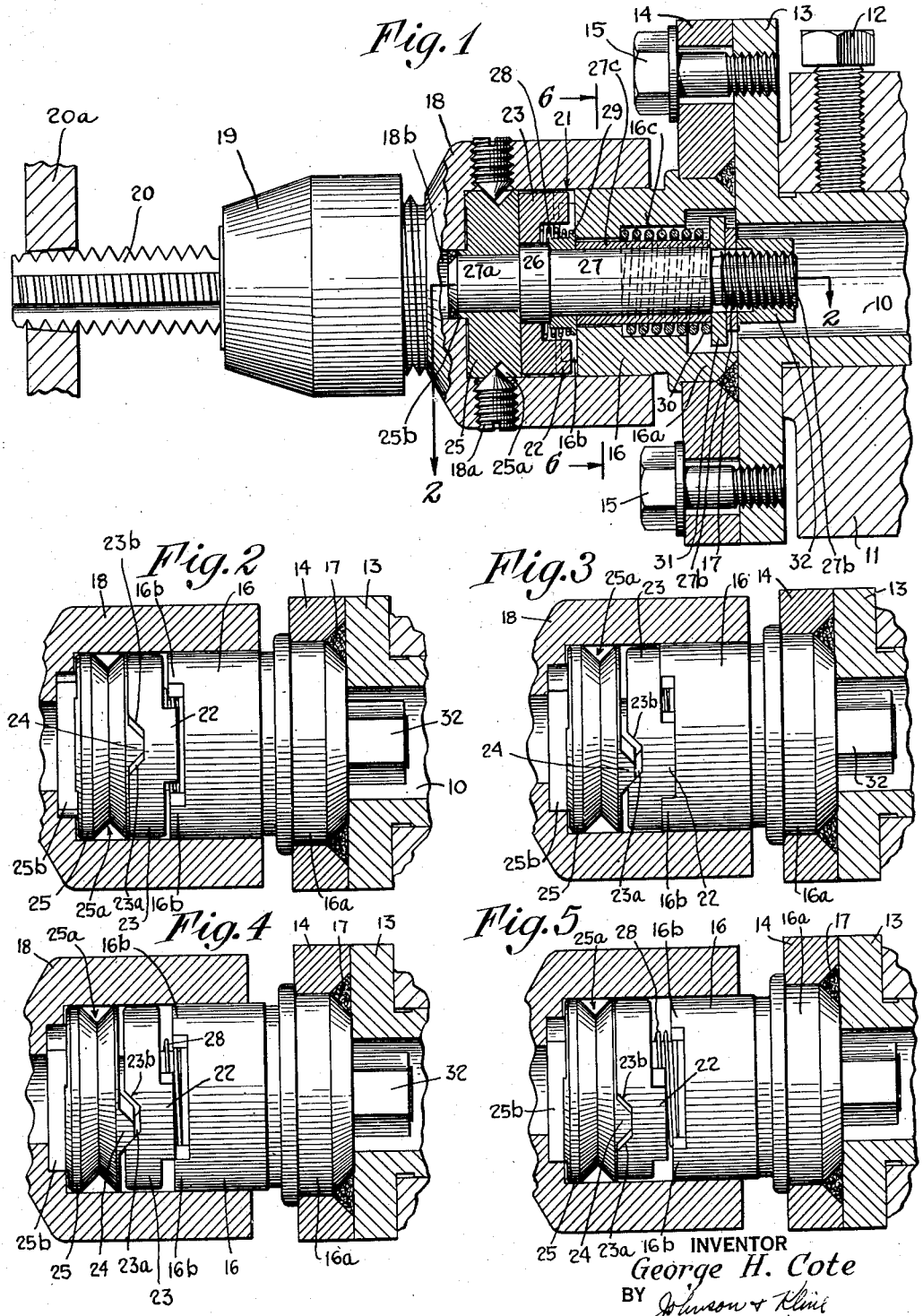
INVENTOR
George H. Cote
BY Johnson & Kline
ATTORNEYS April 25, 1950     G. H. COTE     2,505,030
RELEASING TOOLHOLDER
Filed July 29, 1944     2 Sheets-Sheet 2
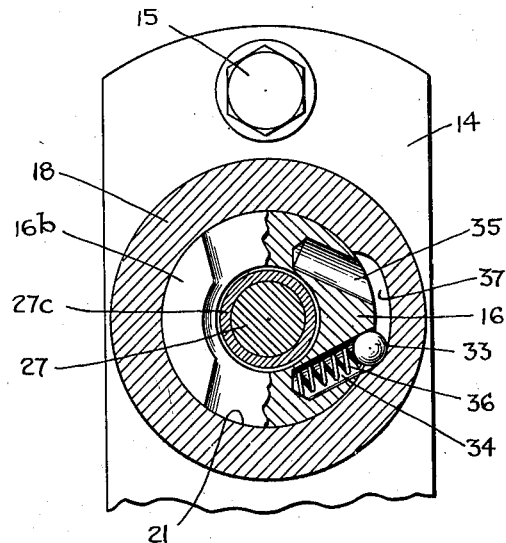
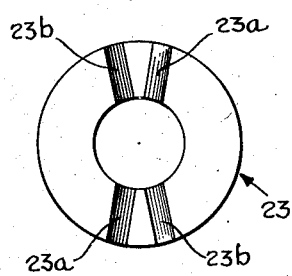 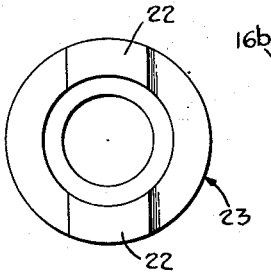 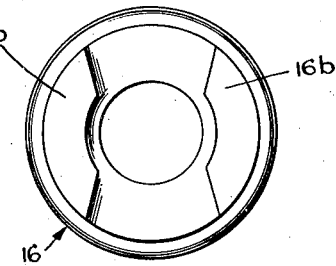
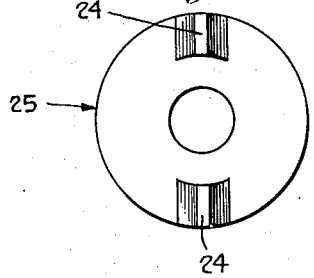 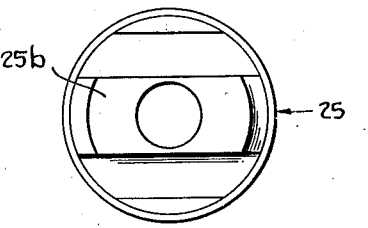
INVENTOR
George H. Cote
BY Johnson + Kline
ATTORNEYS Patented Apr. 25, 1950

2,505,030

UNITED STATES PATENT OFFICE 2,505,030

RELEASING TOOLHOLDER

George H. Cote, Bridgeport, Conn.

Application July 29, 1944, Serial No. 547,257

14 Claims. (Cl. 10—86)

This invention relates to tool holders for automatic screw machines, turret lathes and the like, and more particularly to holders of the releasing type.

Various means have been employed heretofore to prevent excessive wear and abrasion of the co-engaging clutch surfaces in releasing-type holders, one such means employing a cam-advanced and spring-retracted coupling member which has clutch teeth providing a driving connection between the mounting and the tool-carrying parts of the holder, this member being so arranged that when the carrier part is axially advanced relative to the mounting part by the threading operation to the point of release from the latter, the co-engaging clutch surfaces are immediately further separated a substantial amount by a retracting movement of the member so that they do not strike each other during the ensuing rotation of the tool carrier part. This construction generally operates satisfactorily to reduce the amount of wear of the clutch surfaces, but has a disadvantage in that it requires disassembly of the holder when a reverse thread is to be cut, that is, when a change is to be made from right hand to left hand threads or vice versa. In order to make this change in these prior devices, the coupling member must be removed and reversed in its position in the holder, thereby reversing the action of the camming teeth associated with the member.

An object of the present invention is to provide a releasing tool holder having means for causing a substantial separation of the clutch teeth, wherein it is not necessary to alter or reposition any of the component parts of the clutch mechanism in order to change from right hand to left hand threading, and vice versa.

This is accomplished by the provision of a novel coupling member and cooperating structure therefor having oppositely directed camming surfaces for advancing the member which are so arranged as to be operative respectively without repositioning for either forward or reverse driving of the tool carrier. Thus, if a right hand thread is being cut, one set of camming surfaces functions to advance the member to the point where the clutch teeth thereof are initially fully meshed with those of the mounting part of the holder preparatory to the driving or thread cutting operation, and if a left hand thread is being cut the other set of camming surfaces becomes operative to advance the coupling member and cause full engagement of the clutch teeth. Upon completion of the desired thread cutting and upon initial disengagement of the clutch teeth by the relative advance of the carrier part the coupling member is moved from its advanced position to a retracted centralized position as determined by the camming surfaces, to cause further separation of the clucth teeth.

A feature of the invention resides in the structure and arrangement of the various component parts whereby a compact construction is attained making possible a reversible releasing holder of small size.

Other features and advantages will hereinafter appear.

In the accompanying drawings showing an embodiment of the invention:

Figure 1 is an axial sectional view showing the improved tool holder with a right-hand tap before starting a cut.

Fig. 2 is a fragmentary axial section on the line 2—2 of Fig. 1, with the clutch parts in elevation.

Fig. 3 is a section similar to that of Fig. 2, but showing the clutch parts after they have moved to driving position, at the beginning of the cutting operation.

Fig. 4 is a similar section, but showing the clutch parts at the instant of separation.

Fig. 5 is a similar section, showing the increased separation of the clutch surfaces after their initial separation, and after the shell of the holder has begun to turn.

Fig. 6 is a fragmentary transverse sectional view taken on the line 6—6 of Fig. 1, showing the ratchet mechanism of the holder.

Fig. 7 is an end elevation of the body or supporting boss of the holder, illustrating the clutch teeth.

Fig. 8 is a face view of the coupling ring, showing the clutch teeth.

Fig. 9 is an opposite face view of the coupling ring, showing the camming teeth.

Fig. 10 is a face view of the camming disk carried by the shell of the holder, and Fig. 11 is an opposite face view of the camming disk, showing the lugs by which it is keyed to the shell.

As shown in Fig. 1, the releasing tool holder of this invention comprises a shank 10 extending into a turret or other supporting machine structure 11 and held therein by a set screw 12. For conveniently initially aligning the tool and tool carrier of the holder with the work, the shank 10 has a two-eared flange 13 cooperating with a similar flange 14 carrying the releasing and tool-carrying mechanism of the holder, each of the flanges having aligned apertures receiving screws 15, the apertures in the flange 14 being sufficiently large to permit adjustable relative positioning of the flanges.

The flange 14 is provided with a supporting boss or body 16 extending laterally thereof and fastened thereto by a neck portion 16a pressed into a central aperture in the flange and welded, as shown at 17.

A tool carrier or shell 18 is provided having a chuck 19 shown carrying a right-hand tap 20 engaging a workpiece 20a, the shell 18 having a bore 21 receiving the body 16 of the holder. The body 16 and shell 18 are cylindrical so that the latter when necessary may rotate about the body.

In threading operations performed with taps, dies or other thread cutters held in a tool holder of the present releasing type, the cutting tool 20 is applied to the work 20a, which latter is being rotated in the machine so that a thread may be cut therein. The tool holder is advanced during the thread cutting operation by the turret 11 of the machine, the chuck 19 and the tool 20 being held against turning by clutch means connected to the mounting part of the holder. At a point immediately prior to completion of the thread cutting, the turret 11 ceases to advance and the remainder of the cutting operation causes the chuck 19 and shell 18 to advance relative to the body 16 to a point where the clutch means is released to permit rotation of the chuck with the work. The clutch, after initial separation of the teeth thereof, operates to cause a further separation of these to prevent them from striking during the rotation of the shell 18, thereby preventing excessive wear.

According to the present invention, the clutch is so constructed that, without disassembly or repositioning of its parts, it will operate to provide a positive driving connection, and subsequently a substantial separation between the co-engaging teeth regardless of whether the holder is being used to cut left hand or right hand threads.

For this purpose the end portion of the body 16 is provided with a pair of oppositely disposed segmental clutch teeth 16b cooperating with segmental teeth 22 on one face of a coupling ring 23 carried within the shell 18 adjacent the end of the body 16. The opposite face of the ring 23 is recessed to provide pairs of camming surfaces 23a and 23b respectively circularly oppositely directed, cooperating with cam-shaped projections 24 on the face of a disk 25 mounted in the shell 18. The disk 25 is preferably made demountable as shown, by the provision of a groove 25a in its periphery, into which extend set screws 18a threaded in the shell 18, and the latter and disk are keyed together by lugs 25b of the disk, which extend into an elongate recess 18b in the shell.

The ring 23 is slidably mounted on a shouldered portion 26 of a stud 27, one end 27a of which extends through the disk 25 and is welded thereto as shown, the ring being yieldably held against the disk by a conical compression spring 28 engaging a collar 29 which may be press fitted on the stud.

Positioning of the shell 18 of the holder on the body 16 is accomplished by engagement of the adjacent surfaces of the collar 29 and body, as shown in Fig. 1, and for the purpose of yieldably holding the shell in this retracted position shown the body is provided with a counterbore 16c receiving a helical compression spring 30, the outer end of which engages a washer 31 secured to the threaded end 27b of the stud by a nut 32. A spaced sleeve 27c is carried on the stud 27 between the washer 31 and the collar 29 to prevent possible shifting of the latter.

According to this construction, the coupling ring 23 provides a positive driving connection between the body 16 and the shell 18 by functioning in the following manner: Considering Figs. 1 and 2, if a torque were to be applied to the shell in either direction, the latter would turn a predetermined amount, which would cause the clutch teeth 16b and 22 to become engaged, and also cause one of the sets of camming surfaces 23a, 23b, depending on the direction of turning, to engage the camming lugs 24. This latter would cause the ring 23 to move axially away from the disk 25, resulting in a more complete meshing of the clutch teeth 16b and 22. This may be seen in Fig. 3. The amount of separation would be limited, however, by engagement of the ring with the collar 29, this occurring before the camming surfaces could entirely disengage each other, so that the ring 23 would be thereby locked to the disk 25, and the shell 18. If accidentally the torque should be removed from the shell 18, the coil spring 28 would merely return the ring 23 to the position of Fig. 1, returning the shell 18 substantially to its initial rotation position. It will be noted that, due to the disposition of the camming surfaces of the disk 25 and ring 23, the action above described would take place regardless of whether the applied torque were clockwise or counterclockwise.

For cooperating with the clutch mechanism described above, to provide for control of the chuck 19 and shell 18 during operation of the tool holder, to be described shortly, a ratchet is provided which is adapted to lock the shell against turning in one selected direction and only at a single rotative position. Referring to Fig. 6, this ratchet comprises a ball 33 carried in either of two recesses 34 or 35 in the body 16, the ball being urged outwardly by a coil spring 36 so as to engage a groove 37 in the bore 21 of the shell when the latter is turning on the body 16. If the ball 33 is in the recess 34 it will permit clockwise rotation of the shell but prevent counter-clockwise rotation, the action of the ball being reversed if it is in the recess 35. The groove 37 extends axially of the shell 18 a sufficient extent to permit operation of the ball 33 as described, during axial movement of the shell relatively to the body 16.

In operation, the releasing holder is normally in the position shown in Figs. 1 and 2, wherein the clutch teeth 22 and 16b are partially meshed. At the instant that the rotating work 20a engages the tap 20 a torque will be applied to the shell 18 and disk 25, and transmitted through the coupling ring 23 to the body 16. This torque, as already explained, operates the camming surfaces between the disk 25 and the ring 23 so that the latter is extended or separated from the disk until it engages the collar 29. In so doing, the clutch teeth 22 and 16b become fully meshed, Fig. 3, and engage each other so that further turning of the shell 18 on the body 16 is prevented. A positive drive is now effected between the body and shell and, as the tap 20 progresses in cutting the work 20a, a point is reached where advance of the turret 11 is halted. Further thread cutting will cause the chuck 19 and shell 18 to advance now with respect to the body 16, thereby causing separation of the clutch teeth 22 and 16b. At the instant of this separation, as shown in Fig. 4, the ring 23 is freed so that the spring 28 will move it axially into engagement with the disk 25, as shown in Fig. 5, further separating the clutch teeth. The tap 20, chuck 19 and shell 18, being now freed from the body 16, will rotate with the work, this rotation being permitted by the ball 33 due to its functioning as a ratchet. The machine now causes the workpiece 20a to reverse its rotation. However, reverse turning of the chuck 19 and shell 18 is prevented at a predetermined rotative position on the body 16 by engagement of the ball 33 with one wall of the groove 37, so that the tap 20 becomes unthreaded from the work. When the workpiece finally releases the tap, the coil spring 30 of the holder will return the shell 18 to the position shown in Figs. 1 and 2, wherein the clutch teeth are partially meshed, since the rotative position in which the shell is locked by the ball 33 is such that the clutch teeth 16b and 22 will be properly aligned for re-engagement.

If at any time it should be desired to replace the right-hand tap 20 with a left-hand tap, the releasing holder of this invention may be conveniently adapted for reverse threading operation in the following manner: The nut 32 carried by the stud 27 is loosened an extent but not removed from the stud. This permits the shell 18 to be pulled outwardly on the boss 16 sufficiently to expose the ratchet ball 33. The latter and the spring 36 are then transferred to the opposite recess 35 in the boss, and the shell is moved back to its initial position. The nut 32 is now tightened, whereupon the tool is ready for use with left-hand threading tools. In operation, the coupling ring 23 functions in a manner similar to that described in connection with the right-hand tap 20, but of course in a reverse direction. It will be noted that by this construction it is not necessary to disassemble the driving clutch of the releasing tool holder, but merely necessary to loosen one nut and reposition the ratchet mechanism.

Variations and modifications may be made within the scope of this invention and portions of the improvements used without others.

I claim:

1. A device of the type described having a mounting part, a tool carrying part, and means mounting the tool carrying part for rotation and axial movement with respect to the mounting part, one of said parts having a coupling mounted thereon for movement between retracted and extended positions with respect to the other part; means keying the coupling to the said one part so as to cause a driving force on the coupling in either of opposite directions to first move the coupling to extended position and then lock the coupling to said one part; and separable cooperating clutch teeth on the coupling and said other part, interlocking when the coupling is in extended position and the said parts are in a predetermined relative axial position, to provide a rotary drive between the parts in either direction, the mounting for the coupling enabling it to be retracted from said extended position in a direction separating the said teeth after the tool carrying part has first been forced axially from the said predetermined relative position to initially disengage the teeth and relieve the driving force on the coupling.

2. A device of the type described having a mounting part, a tool carrying part, and means mounting the tool carrying part for rotation and axial movement with respect to the mounting part, one of said parts having a coupling mounted thereon for movement between retracted and extended positions with respect to the other part; means keying the coupling to the said one part so as to cause a driving force on the coupling in either of opposite directions to first move the coupling to extended position and then lock the coupling to said one part; separable cooperating clutch teeth on the coupling and said other part, interlocking when the coupling is in extended position and the said parts are in a predetermined relative axial position, to provide a rotary drive between the parts, in either direction, the mounting for the coupling enabling it to be retracted from said extended position in a direction separating the said teeth after the tool carrying part has first been forced axially from the said predetermined relative position to initially disengage the teeth and relieve the driving force on the coupling; and yieldable means for moving and holding the coupling in retracted position so that upon said initial disengagement of the clutch teeth the coupling will be automatically retracted to further separate said teeth.

3. A device of the type described having a mounting part, a tool carrying part, and means mounting the tool carrying part for rotation and axial movement with respect to the mounting part, one of said parts having a coupling mounted thereon for movement between retracted and extended position with respect to the other part; means keying the coupling to the said one part so as to cause a driving force on the coupling in either of opposite directions to first move the coupling to extended position and then lock the coupling to said one part; separable cooperating clutch teeth on the coupling and said other part, interlocking when the coupling is in extended position and the said parts are in a predetermined relative axial position, to provide a rotary drive between the parts in either direction, the mounting for the coupling enabling it to be retracted from said extended position in a direction separating the said teeth after the tool carrying part has first been forced axially from the said predetermined relative position to initially disengage the teeth and relieve the driving force on the coupling; a stop, and spring means, yieldably holding the mounting and tool carrying parts in said predetermined axial position; and a ratchet unidirectionally locking the tool carrying part at a predetermined rotative position with respect to the mounting part, said position being such that the separable clutch teeth are positioned for meshing, so that after said disengagement of the teeth has taken place and upon removal of the axial force from the tool carrying part the latter will be returned by the said spring means to its predetermined axial position.

4. A device of the type described having a mounting body and a tool carrying part rotatably and axially movable on the body; a stop carried by the tool carrying part and locating the tool carrying part in a predetermined axial position on said body; a coupling part rotatably and axially movable with respect to the tool carrying part and located adjacent said body, the latter and the coupling part having partially meshing separable clutch teeth for locking the body and coupling part against free relative rotative movement in either direction; cooperating cams on the coupling and tool carrying parts, comprising a projection on one of said parts having oppositely sloping walls, and a recess in the other part having respectively cooperating walls whereby relative rotative movement of the parts in either direction causes relative axial movement so as to more fully mesh the said clutch teeth; stop means connected to the tool carrying part and limiting said axial movement and holding the said coupling and tool carrying parts against further relative rotative movement so that the tool carrying part is thereby held by the clutch teeth against free turning on the body; and means yieldably holding the coupling and tool carrying parts against relative axial movement whereby after they have been so moved in response to relative turning and when the tool carrying part is axially moved from said predetermined position so as to cause initial separation of the clutch teeth, the coupling part will be automatically axially moved so as to further separate said teeth.

5. A device of the type described having a mounting body and a tool carrying part including a shell enclosing a portion of the body, rotatably and axially movable thereon; a stop carried by the tool carrying part and engaging the body and locating the tool carrying part on the body in a predetermined position; a circular coupling part rotatably and axially movable in the shell adjacent the enclosed portion of the body, the latter and the coupling part having partially meshing separable clutch teeth for locking the body and coupling part against free relative rotative movement in either direction; cooperating cams on the coupling and tool carrying parts, comprising a projection on one of said parts having opposite sloping walls, and a recess in the other part having respectively cooperating walls whereby relative rotative movement of the parts in either direction causes relative axial movement so as to more fully mesh the said clutch teeth; stop means connected to the tool carrying part to limit said relative axial movement and for holding the tool carrying and coupling parts against further relative rotative movement, so that the tool carrying part is thereby held by the clutch teeth against free turning on the body; and means yieldably holding the tool carrying and coupling parts against relative axial movement whereby after they have been so moved in response to relative turning and when the tool carrying part is axially moved from said predetermined position so as to cause initial separation of the clutch teeth, the coupling part will be automatically axially moved so as to further separate said teeth.

6. A releasing tool holder comprising a mounting part; a tool carrying part rotatably and axially movable on the mounting part; a coupling member having a pair of opposed clutch teeth; means movably mounting the coupling member on one of said parts so as to locate the teeth of the coupling member next to the other part, said mounting means enabling the coupling member to be moved from an intermediate position to either of two limits wherein at least one of the said clutch teeth are advanced with respect to the said other part; means engaging and holding together the coupling member and the part on which it is mounted when the coupling member is in either of said limits; a pair of clutch teeth on the said other part individually engageable with the individual teeth of the coupling member, said engageable teeth fully meshing when the said parts are in a predetermined relative axial position and the coupling member is at one of said limits, said coupling member being moved to and held at one or the other of said limits when a turning force in one direction or the other respectively is applied to the tool carrying part and the clutch teeth are in full meshing engagement; and means automatically moving the coupling member to its intermediate position wherein its teeth are retracted, when the tool carrying part has been shifted axially out of its predetermined relative axial position an extent sufficient to initially separate the meshed clutch teeth, thereby to further separate the teeth.

7. A device of the type described having a mounting body; a tool carrier rotatably and axially movable thereon; a coupling member mounted on the carrier and rotatable thereon between limits and movable thereon from a retracted to an extended position and vice versa with respect to the carrier; means connected to the coupling member and carrier and advancing the coupling member from the retracted to an extended position when it is turned from an intermediate rotative position to either of said limits in response to application of a turning force, said body and coupling member having cooperating separable clutch surfaces whereby when the coupling member is in extended position and the carrier and body are in a predetermined relative axial position the carrier is locked by the coupling member against free rotation in either direction on the body, the mounting for the coupling member enabling it to be retracted from said extended position in a direction separating the said clutch surfaces after the carrier has first been moved axially from said predetermined axial position to initially disengage the said clutch surfaces and relieve the turning pressure on said coupling.

8. A device of the type described having a mounting body; a tool carrier rotatably and axially movable thereon; a coupling member mounted on the carrier and rotatable thereon between limits and movable thereon from a retracted to an extended position and vice versa with respect to the carrier; interengaging means on the coupling member and carrier advancing the coupling member from the retracted to an extended position when it is turned from an intermediate rotative position to either of said limits in response to application of a turning force; and yieldable means for moving and for holding the coupling member in retracted intermediate rotative position, said body and coupling member having cooperating separable clutch surfaces whereby when the coupling member is in extended position and the carrier and body are in a predetermined relative axial position the carrier is locked by the coupling member against free rotation in either direction on the body, the mounting for the coupling member enabling the said yieldable means to retract it from its extended position in a direction separating the said clutch surfaces after the carrier has first been moved axially from said predetermined axial position to initially disengage the said clutch surfaces and relieve the turning pressure on said coupling member.

9. A device of the type described having a mounting body; a shell enclosing a portion of the body, rotatably and axially movable thereon; a stop connected with the shell locating the shell on the body in a predetermined position; a member rotatably and axially movable in the shell adjacent the enclosed portion of the body, the latter and the member having partially-meshing separable clutch teeth; cooperating cams on the member and shell whereby relative rotative movement in either direction causes axial separating movement between the member and shell to more fully mesh the said clutch teeth; stop means connected with the shell and engaging the member and limiting said separating movement, said cams and stop means holding the shell and member against further relative rotative movement, so that the shell is thereby held by the clutch teeth against free turning on the body; and means yieldably holding the member and shell against axial separating movement whereby after they have been so moved in response to relative turning and when the shell is axially moved from said predetermined position so as to cause initial separation of the clutch teeth, the said member will be automatically axially moved so as to further separate said teeth.

10. A device of the type described having a centrally bored cylindrical mounting body; a shell enclosing an end and peripheral portion of the body, rotatably and axially movable thereon; a stud fastened to the shell, extending through the bore of the body; abutment means between the stud and body for locating the shell on the body in a predetermined position; a ring rotatably and axially movable on the stud adjacent the inner end of the body, the latter and the ring having partially-meshing separable clutch teeth; cooperating cams on the ring and shell whereby relative rotative movement in either direction causes axial separating movement between the ring and shell to more fully mesh the said clutch teeth; stop means connected with the shell and engaging the ring and limiting said separating movement, said cams and stop means holding the shell and ring against further relative rotative movement, so that the shell is thereby held by said clutch teeth against free turning on the body; and means for yiedably holding the ring and shell against axial separating movement whereby after the same have been so moved in response to relative turning and when the shell is axially moved from said predetermined position so as to cause initial separation of the clutch teeth, the ring will be automatically axially moved so as to further separate said teeth.

11. A device of the type described having a centrally bored cylindrical mounting body; a shell enclosing an end and peripheral portion of the body, rotatably and axially movable thereon; a stud fastened to the shell, extending through the bore of the body; a stop connected to the shell; spring means engaging the stud and body and yieldably holding the stop on the shell in engagement with the body in a predetermined position; a ring rotatably and axially movable on the stud adjacent the inner end of the body, the latter and the ring having partially-meshing separable clutch teeth; cooperating cams on the ring and shell whereby relative rotative movement in either direction causes axial separating movement between the ring and shell to more fully mesh the said clutch teeth; stop means connected to said shell and engaging the ring and limitng said separating movement, said cams and stop means holding the shell and ring against further relative rotative movement, so that the shell is thereby held by the clutch teeth against free turning on the body; and means engaging and yieldably holding the ring and shell against axial separating movement whereby after the clutch teeth have been more fully meshed and the shell is moved under force axially against the said spring means and out of said predetermined position to cause initial separation of the clutch teeth, the ring will be automatically axially moved by the yieldable means to further separate said teeth, the shell being returned to its predetermined position by said spring means upon removal of said force.

12. A device of the type described having a centrally bored cylindrical mounting body; a shell enclosing an end and peripheral portion of the body, rotatably and axially movable thereon, said shell having chucking means for carrying a thread-cutting tool whereby turning movements may be imparted to the tool and shell; a ratchet unidirectionally locking the shell against rotation at a predetermined rotative position on the body; a stud fastened to the shell, extending through the bore of the body; a stop connected to the shell; spring means engaging the stud and body and yieldably holding the stop on the shell in engagement with the body in a predetermined axial position; a ring rotatably and axially movable on the stud adjacent the inner end of the body, the latter and the ring having partially-meshing separable clutch teeth; cooperating cams on the ring and shell whereby relative rotative movement from an intermediate position in either direction causes axial separating movement between the ring and shell to more fully mesh the said clutch teeth, the said predetermined rotative position of the shell as controlled by the ratchet being such that the clutch teeth are positioned for meshing; stop means connected to said shell and engaging the ring and limiting said separation of the ring and shell, said cams and stop means holding the same against further relative rotative movement, so that the shell is thereby held by the clutch teeth against free turning on the body; and means engaging and yieldably holding the ring and shell against axial separating movement whereby after the clutch teeth have been more fully meshed and when force is exerted on the shell to axially move the same against the said spring means and cause initial separation of the clutch teeth and freeing of the shell for turning, the ring will be automatically axially moved so as to further separate said teeth, the shell upon the removal of said force and after it has been locked by said ratchet being returned by said spring means to its predetermined position wherein the clutch teeth mesh.

13. A device of the type described having a centrally bored cylindrical mounting body; a shell enclosing an end and peripheral portion of the body, rotatably and axially movable thereon, said shell having chucking means for carrying a thread-cutting tool whereby turning movements may be imparted to the tool and shell and having a groove on its inside surface extending partially around the shell; a spring-urged ball movably mounted in the body to engage the ends of said groove for unidirectionally locking the shell at a predetermined rotative postion; a stud-fastened to the shell, extending through the bore of the body; a stop connected to the shell; spring means engaging the stud and body and yieldably holding the stop on the shell in engagement with the body in a predetermined axial position; a ring rotatably and axially movable on the stud adjacent the inner end of the body, the latter and the ring having partially-meshing separable clutch teeth for locking the same against free relative rotation in either direction; cooperating cams on the ring and shell whereby relative rotative movement from a predetermined position in either direction causes axial separating movement between the ring and the shell to more fully mesh the said clutch teeth, the said predetermined rotative position of the shell as controlled by the ball being such that the cooperating clutch teeth are positioned for meshing; stop means connected to said shell and engaging the ring and limiting said separating movement of the ring and shell, said cams and stop means holding the same against further relative rotative movement, so that the shell is thereby held by the clutch teeth against free turning on the body; and means engaging and yieldably holding the ring and shell against axial separating movement whereby after the clutch teeth have been more fully meshed and axial force has been exerted on the shell to axially move the same against the said spring means and cause initial separation of the clutch teeth and freeing of the shell for turning, the ring will be automatically axially moved so as to further separate said teeth, the shell upon the removal of said force and after it has been locked by said ball being returned by said spring means to its predetermined position wherein the clutch teeth mesh.

14. A device of the type described having a centrally bored cylindrical mounting body; a shell enclosing an end and peripheral portion of the body, rotatably and axially movable thereon; a disk mounted rigidly in the shell in axial alignment with the body; a stud fastened to the disk, extending through the bore of the body; means including a stop, and spring means engaging the extended end of the stud and the body, for locating the shell on the latter in a predetermined position; a coupling ring rotatably and axially movable on the stud between the disk and the enclosed portion of the body, the latter and the ring having partially-meshing separable clutch teeth for locking the body and ring against free relative rotative movement in either direction; cooperating cams on the ring and disk whereby relative rotative movement in either direction causes relative axial movement so as to more fully mesh the said clutch teeth; stop means engaging said ring and limiting said axial movement, said stop means and cams holding the ring and disk against further relative rotative movement, so that the shell is thereby held by the clutch teeth against free turning on the body; and means yieldably holding the ring and disk against relative axial movement whereby after they have been so moved in response to relative turning and when the shell is axially moved from said predetermined position so as to cause initial separation of the clutch teeth, the ring will be automatically axially moved so as to further separate said teeth.

GEORGE H. COTE.

REFERENCES CITED

The following references are of record in the file of this patent:

UNITED STATES PATENTS

| Number | Name | Date |
|---|---|---|
| 1,050,802 | Bryant | Jan. 21, 1913 |
| 1,164,315 | Procunier | Dec. 14, 1915 |
| 2,147,203 | Kylin | Feb. 14, 1939 |
| 2,206,047 | Poorman | July 2, 1940 |
| 2,378,659 | Ross | June 19, 1945 |
| 2,392,809 | Cote | Jan. 15, 1946 |